(12) United States Patent
Nakao (10) Patent No.: US 9,886,344 B2
(45) Date of Patent: Feb. 6, 2018

(54) STORAGE SYSTEM AND STORAGE APPARATUS

(71) Applicant: FUJITSU LIMITED, Kawasaki-shi, Kanagawa (JP)

(72) Inventor: Takanori Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 14/919,904

(22) Filed: Oct. 22, 2015

(65) Prior Publication Data

US 2016/0139990 A1 May 19, 2016

(30) Foreign Application Priority Data

Nov. 13, 2014 (JP) ................................ 2014-230475

(51) Int. Cl.
*G11C 29/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0673* (2013.01); *G06F 11/1088* (2013.01); *G06F 11/1096* (2013.01)

(58) Field of Classification Search
None
See application file for complete search history.

(56) References Cited

U.S. PATENT DOCUMENTS

| 5,761,402 A * | 6/1998 | Kaneda .................. G06F 3/0613 714/6.24 |
| 6,012,839 A * | 1/2000 | Nguyen .............. G06F 11/1004 714/755 |
| 6,035,373 A * | 3/2000 | Iwata .................... G06F 3/0613 711/114 |
| 7,085,953 B1 | 8/2006 | Hsu et al. |
| 2011/0010599 A1 | 1/2011 | Goel et al. |
| 2014/0189202 A1* | 7/2014 | Hosaka ................. G06F 3/0616 711/103 |
| 2015/0199236 A1* | 7/2015 | Selivanov ........... G06F 11/1096 714/6.24 |

FOREIGN PATENT DOCUMENTS

| JP | 2000-148409 | 5/2000 |
| JP | 2006-505035 | 2/2006 |
| JP | 2013-506191 | 2/2013 |

* cited by examiner

*Primary Examiner* — M. Mujtaba Chaudry
(74) *Attorney, Agent, or Firm* — Staas & Halsey LLP (57) ABSTRACT

A storage apparatus includes a processor. The processor is configured to sequence a plurality of data pieces. The plurality of data pieces are respectively stored in a plurality of memory devices. The processor is configured to set compensation ranges to be respectively compensated by a first predetermined number of parities. The compensation ranges are respective portions of consecutive data pieces among the sequenced data pieces. The compensation ranges include a variably set number of data pieces for the respective parities. Each of the plurality of data pieces is included in a second predetermined number of compensation ranges.

7 Claims, 10 Drawing Sheets

COMPARATIVE EXAMPLE #1
(LENGTH OF RANGE = ENTIRETY)

COMPARATIVE EXAMPLE #2
(LENGTH OF RANGE = FIXED)

IMPROVEMENT OF RECOVERY SPEED

EMBODIMENT
(LENGTH OF RANGE = VARIABLE)

RELIABILITY ENHANCEMENT

STORAGE SYSTEM AND STORAGE APPARATUS

CROSS-REFERENCE TO RELATED APPLICATION

This application is based upon and claims the benefit of priority from the prior Japanese Patent Application No. 2014-230475, filed on Nov. 13, 2014, the entire contents of which are incorporated herein by reference.

FIELD

The embodiments discussed herein are related to a storage system and a storage apparatus.

BACKGROUND

In a field of distributed storage, a replication technology is widely spread in which data is duplicated so as to avoid data loss due to a disk failure or a block failure. In recent years, an erasure code technology is being actively researched and developed in which data is efficiently encoded to incorporate a minimum redundancy so as to implement further improvements in reliability and capacity efficiency.

There is a so-called Reed-Solomon (RS) code as a sort of erasure code. In a conventional redundant array of inexpensive disks (RAID) in which the RS code is adopted, a parity is calculated from all of the disks made to be redundant. Accordingly, the data and the parity used for restoring lost data are read from most of the disks in order to restore the lost data when a fault occurs.

When the number of disks from which the data and the parity used for restoration are read is increased, a processing load on read processing is increased. In the distributed storage in which a plurality of nodes equipped with disks are connected through a network, a data transfer amount between the nodes is increased. Such an increase of the processing load or the data transfer amount may cause reduction of a recovery speed.

As a technology relevant to data restoration, an n-way parity protection technique has been suggested in which restoration from a failure is enabled for up to "n" memory devices in a parity group of a storage array encoded to provide protection against an n-way disk failure.

A data restoration technology has also been suggested in which a plurality of data disks are arranged in a matrix form with n rows and m columns and the parities of redundant disks of the respective columns and the parities of redundant disks of the respective rows are used to restore data of a data disk when multiple faults occur. Further, a technology has been suggested in which data, copies of the data, and parities are distributed to be arranged in different disks on a disk array.

Related techniques are disclosed in, for example, Japanese National Publication of International Patent Application No. 2013-506191, Japanese Laid-open Patent Publication No. 2000-148409, and Japanese National Publication of International Patent Application No. 2006-505035.

In a case of RAID in which parities are calculated from all of the redundant disks, the same number of data pieces as the number of the parities may be restored. However, there is room for improvement on the recovery speed. When each of a plurality of parities is calculated using data of a portion of a plurality of data disks and the entire data is compensated using the plurality of parities, the recovery speed may be improved. However, depending on the setting of data ranges (compensation range) to be compensated by the respective parities, there is a risk that unrecoverable data is generated when multiple faults occur.

Here, the compensation refers that lost data is to be restored using the remaining data in a compensation range including the lost data and a parity associated with the compensation range. A recovery speed and reliability (reduction in the risk) are in a tradeoff relationship. As described above, in a case where each of a plurality of parities is calculated using data of a portion of disks, the improvement of reliability may be expected when the number of parities is increased, but the recovery speed may be reduced in exchange for the improvement of reliability. In other words, when it is possible to reduce the risk without increasing the number of parities, it becomes possible to improve the reliability while suppressing the reduction of recovery speed.

SUMMARY

According to an aspect of the present invention, provided is a storage apparatus including a processor. The processor is configured to sequence a plurality of data pieces. The plurality of data pieces are respectively stored in a plurality of memory devices. The processor is configured to set compensation ranges to be respectively compensated by a first predetermined number of parities. The compensation ranges are respective portions of consecutive data pieces among the sequenced data pieces. The compensation ranges include a variably set number of data pieces for the respective parities. Each of the plurality of data pieces is included in a second predetermined number of compensation ranges.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, descriptions will be made on embodiments with reference to the accompanying drawings. Similar reference numerals are given to constitutional elements having a similar function, and the redundant descriptions thereof may be omitted

First Embodiment

Figure 1:
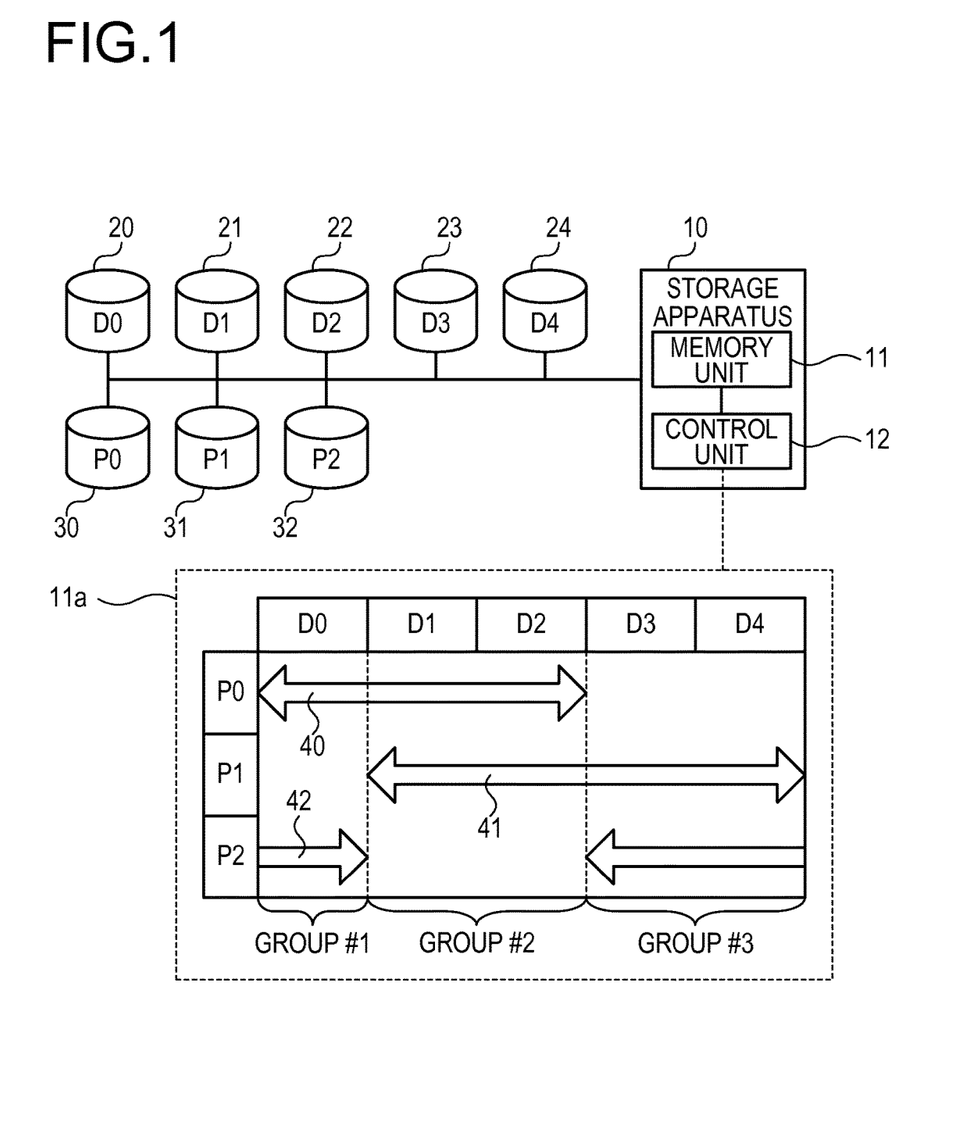
FIG. 1 is a diagram illustrating an exemplary storage system according to a first embodiment.

A first embodiment will be described with reference to FIG. 1. FIG. 1 is a diagram illustrating an exemplary storage system according to the first embodiment.

A storage system according to the first embodiment includes a plurality of memory devices 20, 21, 22, 23, 24, 30, 31, and 32, and a storage apparatus 10. The number of storage apparatuses and the number of memory devices to be included in the storage system is not limited to the number those illustrated in the example of FIG. 1.

The memory devices 20, 21, 22, 23, 24, 30, 31, and 32 may be implemented with, for example, a hard disk drive (HDD) or a solid state drive (SSD). The storage apparatus 10 may be a computer such as a server computer.

The storage apparatus 10 is connected to the memory devices 20, 21, 22, 23, 24, 30, 31, and 32. The method for connecting the storage apparatus with the memory devices may be either a direct connection through an interface such as serial attached small computer system interface (SAS) or a connection through a network as in the distributed storage.

The storage apparatus 10 includes a memory unit 11 and a control unit 12. The memory unit 11 may be either a volatile memory device such as a random access memory (RAM) or a non-volatile memory device such as an HDD or a flash memory. The control unit 12 is a processor such as a central processing unit (CPU) or a digital signal processor (DSP). The control unit 12 may be an electronic circuit such as an application specific integrated circuit (ASIC) or a field programmable gate array (FPGA). The control unit 12 executes a program stored in, for example, the memory unit 11 or other memory.

Data D0, Data D1, data D2, data D3, and data D4 are stored in the memory device 20, the memory device 21, the memory device 22, the memory device 23, and the memory device 24, respectively. A parity P0, a parity P1, and a parity P2 are stored in the memory device 30, the memory device 31, and the memory device 32, respectively.

The control unit 12 sets a plurality of parities each of which compensates for continuous data among the data D0, D1, D2, D3, and D4. Hereinafter, a range of data for which a single parity compensates may be referred to as a compensation range. Compensation range information 11a indicates a relationship among the data D0, D1, D2, D3, and D4, the parities P0, P1, and P2, and the compensation ranges 40, 41, and 42 that correspond to the parities P0, P1, and P2, respectively. For example, the parity P0 compensates for data D0, D1, and D2 included in the compensation range 40.

Compensating for the data D0 by the parity P0 indicates that the data D0 may be restored using the parity P0. The parity P0 is calculated using the data D0, D1, and D2 included in the compensation range 40 that corresponds to the parity P0. Therefore, in a case where the data D0 is lost, the data D0 may be restored using the data D1 and D2, and the parity P0. Similarly, the parity P0 may be used so as to restore the data D1 or D2. The parity P0 is an erasure code such as the RS code.

The control unit 12 sets the parities P0, P1, and P2 in the example of the compensation range information 11a. At this time, the control unit 12 sets the compensation ranges 40, 41, and 42 to be variable for each parity, and sets the compensation ranges 40, 41, and 42 of the parities such that each of the data D0, D1, D2, D3, and D4 is included in a predetermined number (2 (two) in this example) of compensation ranges. The continuity in the range is taken into account by setting the data following the data D4 as the data D0.

For example, the compensation range 40 corresponding to the parity P0 includes three pieces of data D0, D1, and D2 (that is, a length of the range is 3 (three)). The compensation range 41 corresponding to the parity P1 includes four pieces of data D1, D2, D3, and D4 (that is, a length of the range is 4 (four)). The compensation range 42 corresponding to the parity P2 includes three pieces of data D3, D4, and D0 (that is, a length of the range is 3 (three)). By setting the length of the range to be variable for each parity as described above, it becomes possible to set the compensation ranges such that the number of parities for compensating for the data is 2 (two).

For example, the control unit 12 divide the data D0, D1, D2, D3, and D4 into the same number of groups #1, #2, and #3 as the number of parities (3 (three) in this example). At this time, the control unit 12 sets each group such that a difference in the number (length of a section) of data pieces that belong to each group between the groups does not exceed 1 (one). In the example of the compensation range information 11a, the length of the section of the group #1 is 1 (one), the length of the section of each of the groups #2 and #3 is 2 (two), and the difference between the lengths of the sections does not exceed 1 (one).

After setting the groups, the control unit 12 sets a compensation range including the predetermined number of groups (2 (two) in this example) described above. For example, the compensation range 40 is set to include two groups #1 and #2. Similarly, the compensation range 41 is set to include two groups #2 and #3 and the compensation range 42 is set to include two groups #3 and #1. By setting the compensation ranges 40, 41, and 42 in this way, the number of parities including each data piece in the compensation range thereof becomes 2 (two).

By setting the compensation ranges as described above, all of the data pieces may be restored even when a fault occurs in the same number of memory devices as the predetermined number. For example, in a case where the memory devices 24 and 32 are failed and the data D4 and the parity P2 are lost, the data D4 may be restored using the data D1, D2, D3, and the parity P1. In the example of the compensation range information 11a, it is guaranteed that all of the data D0, D1, D2, D3, and D4 may be restored when arbitrary two memory devices are failed.

For the purpose of comparison, when it is assumed that only the data D1, D2, and D3 are included in the compensation range 41 (that is, when the length of the range of all the parities is fixed to 3 (three)) in the compensation range information 11a, the data D4 may not be restored when the memory devices 24 and 32 are failed. Such a situation does not occur in the storage system according to the first embodiment.

According to the first embodiment, restoration of data is guaranteed for the failure of the same number of memory devices as the predetermined number described above regardless of the combination of the failed memory devices. That is, even when the number of the parities are the same, it is possible to obtain a higher reliability as compared with a case where the length of the range is fixed for all the parities. So far, the first embodiment has been described.

Second Embodiment

Next, a second embodiment will be described.

The second embodiment relates to a method for setting a parity in a RAID device on which a plurality of memory devices such as HDDs are mounted or a storage system in which a plurality of RAID devices are connected through a network. The second embodiment provides a technique for setting a plurality of parities each of which compensates for data stored in a portion of a plurality of memory devices to be compensated, and compensating for the entire data stored in the plurality of memory devices using the plurality of parities. Also, the second embodiment provides a method for setting, for each parity, a range (compensation range) of data to be compensated by each parity.

According to the technique according to the second embodiment, as compared to a case where a parity that compensates for data stored in all of the plurality of memory devices is used, a time required for acquiring data used for restoring the lost data from memory devices may be reduced such that the recovery is performed at a high speed. Further, the compensation range of each parity may be variably set for each parity such that the number of restorable data becomes constant regardless of the combination of the failed memory devices, thereby contributing to the improvement of reliability.

Figure 2:
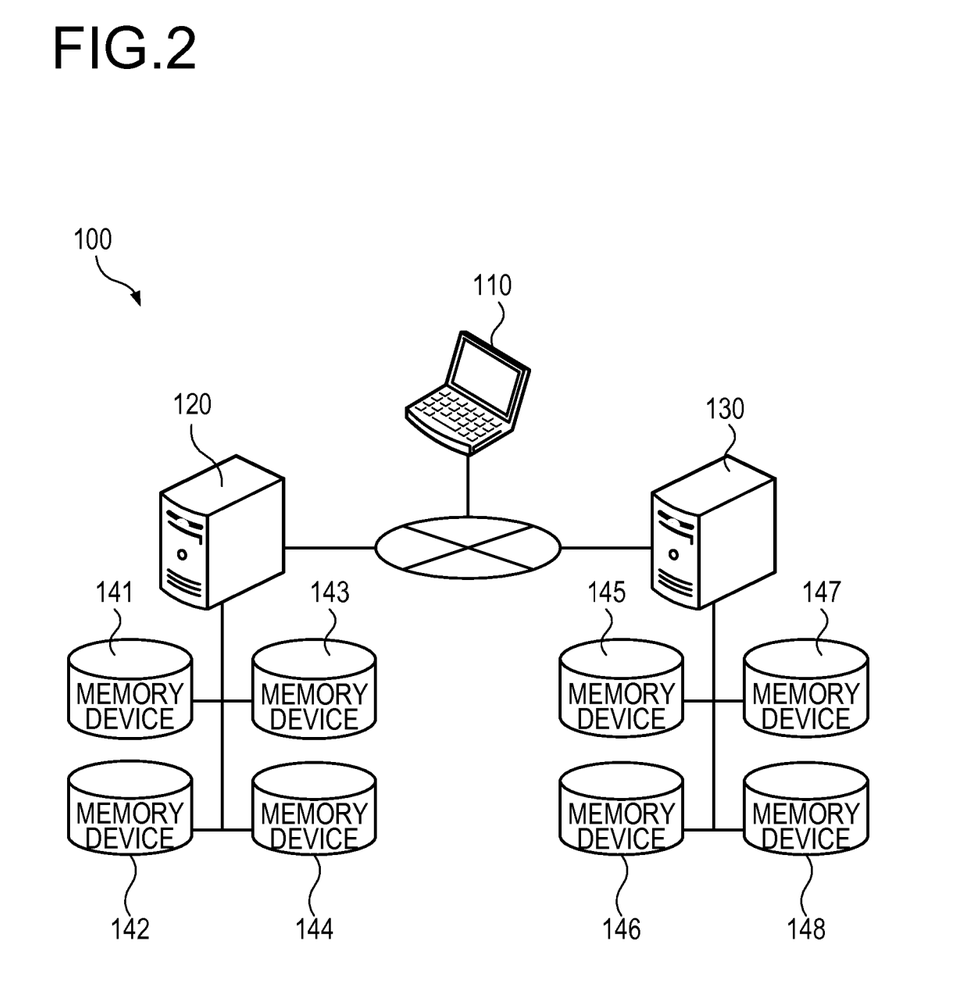
FIG. 2 is a diagram illustrating an exemplary storage system according to a second embodiment.

Descriptions will be made on a storage system according to the second embodiment. FIG. 2 is a diagram illustrating an exemplary storage system according to the second embodiment. A storage system 100 illustrated in FIG. 2 is an example of the storage system according to the second embodiment.

As illustrated in FIG. 2, the storage system 100 includes a client device 110 and a plurality of storage apparatuses 120 and 130. The client device 110 is connected with the storage apparatuses 120 and 130 through a network.

The storage apparatus 120 is connected to memory devices 141, 142, 143, and 144. Inputting and outputting of data for the memory devices 141, 142, 143, and 144 are performed through the storage apparatus 120. The storage apparatus 130 is connected to memory devices 145, 146, 147, and 148. Inputting and outputting of data for the memory devices 145, 146, 147, and 148 are performed through the storage apparatus 130.

The client device 110, through the storage apparatuses 120 and 130, executes a writing operation of data in the memory devices 141, 142, 143, 144, 145, 146, 147, and 148, or a reading operation for data stored in the memory devices 141, 142, 143, 144, 145, 146, 147, and 148. For example, the client device 110 transmits data to be written in the memory device 141 to the storage apparatus 120. The storage apparatus 120 receives the transmitted data to be written and stores the received data to be written in the memory device 141.

A set of the memory devices 141 to 148 operates as a disk array. The data stored in the disk array are split into a plurality of divided data (data chunks) and distributed to be stored in any of the memory devices 141 to 148. For example, five data chunks are distributed to be stored in the memory devices 141, 142, 143, 145, and 146.

A parity (parity chunk) calculated from the plurality of data chunks is stored in a memory device among the memory devices 141 to 148, in which none of the plurality of data chunks is not stored. For example, three parity chunks each of which is calculated using five data chunks stored in the memory devices 141, 142, 143, 145, and 146 and has a different compensation range are distributed to be stored in the memory devices 144, 147, and 148.

The parity chunk is an erasure code such as the RS code. A single parity chunk is calculated from a plurality of data chunks. For example, a single parity chunk is calculated from three data chunks. In this case, three data chunks used for the calculation becomes the compensation range of the calculated parity chunk. That is, in a case where one of the data chunks used for the calculation is lost, the lost data chunk may be restored using the remaining data chunks and the parity chunk.

The compensation range of a parity chunk is set to be different for each parity chunk. When setting the compensation range, the size of the compensation range (length of the range) is variably set for each parity chunk. However, each of the number "k" of data chunks, the number "m" of parity chunks, and the number "c" of parity chunks that compensate respective data chunks is set to a fixed value (compensation number) in advance. For example, "k" is set to 5 (five), "m" is set to 3 (three), and "c" is set to 2 (two). The storage apparatus 120 executes setting of the compensation ranges and the calculation of the parity chunks. However, the setting and the calculation may be executed by the storage apparatus 130.

When some of the memory devices 141, 142, 143, 145, and 146 are failed and some data chunks are lost, the storage apparatus 120 restores a lost data chunk using a parity chunk which includes the lost data chunk in the compensation range thereof. At this time, the storage apparatus 120 uses data chunks included in the compensation range. After the lost data chunk is restored, the storage apparatus 120 stores the restored data chunk in a memory device for replacement which is prepared in advance.

As described above, by setting a compensation range so as to compensate for a portion of data chunks, the portion of data chunks may be read when restoring the lost data chunk. As a result, the recovery speed becomes faster as compared to a case where all the data chunks are read.

By setting the length of a compensation range to be variable for each parity chunk, it becomes possible to flexibly set the compensation range. A method for setting the compensation range will be described later. With the same number of parity chunks, the method makes it possible to implement the setting of compensation range having improved reliability.

In the foregoing, the storage system according to the second embodiment has been described. In the following, for the convenience of explanation, the storage system 100 illustrated in FIG. 2 is exemplified, but the range of application for the technique according to the second embodiment is not limited to the storage system 100. For example, the number of storage apparatuses or the memory devices may be arbitrarily set, and the technique according to the second embodiment may also be applied to a single RAID device. It is noted that such variation of the number of devices or devices for the compensation may also fall within the technical scope of the second embodiment.

Figure 3:
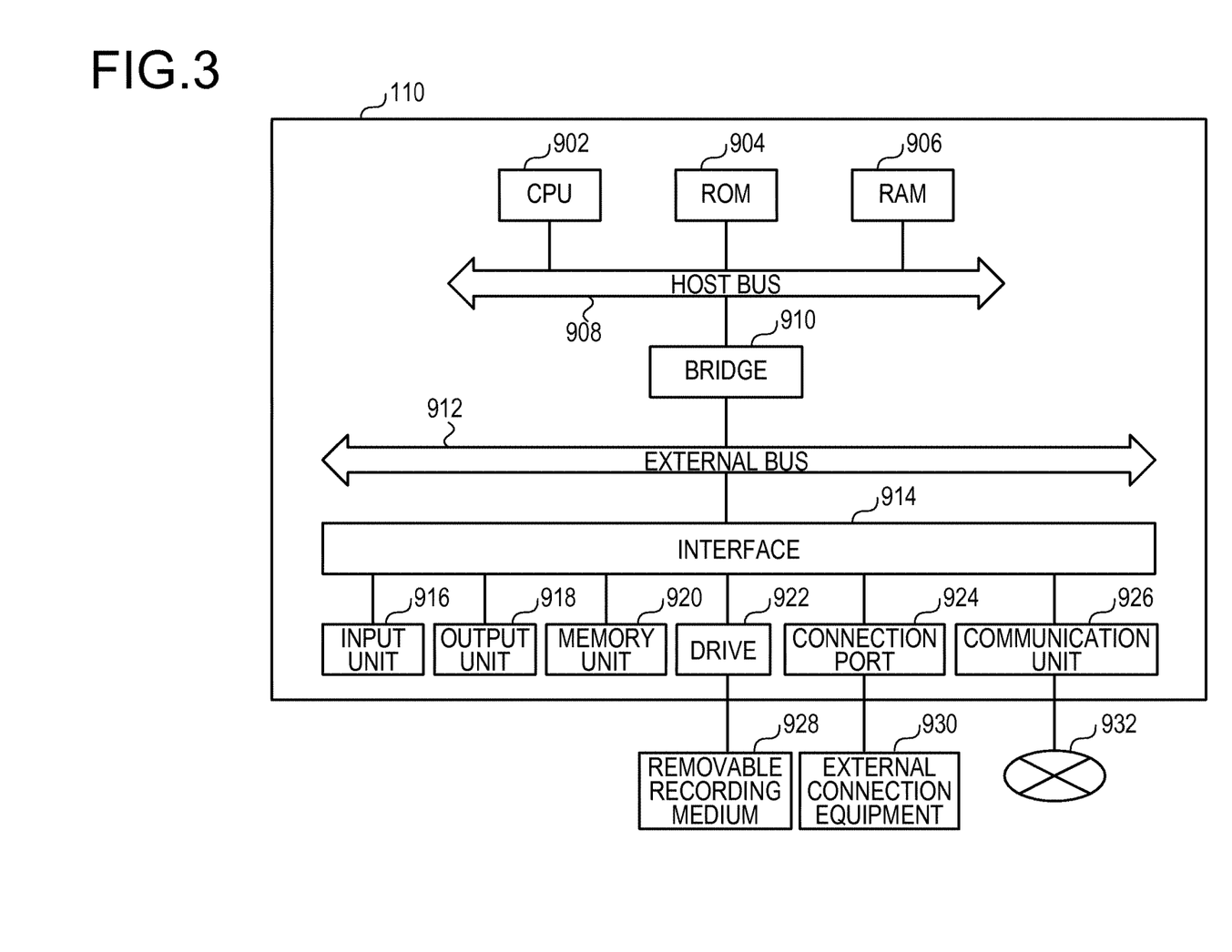
FIG. 3 is a diagram illustrating an exemplary hardware configuration of a client device according to the second embodiment.

Here, descriptions will be made on the hardware of the client device 110. FIG. 3 is a diagram illustrating an exemplary hardware configuration of a client device according to the second embodiment. The functions equipped in the client device 110 may be implemented using, for example, hardware resources of the information processing apparatus illustrated in FIG. 3. That is, the functions equipped in the client device 110 are implemented by executing a computer program to control the hardware illustrated in FIG. 3.

As illustrated in FIG. 3, the hardware mainly includes a CPU 902, a read-only memory (ROM) 904, a RAM 906, a host bus 908, and a bridge 910. The hardware further includes an external bus 912, an interface 914, an input unit 916, an output unit 918, a memory unit 920, a drive 922, a connection port 924, and a communication unit 926.

The CPU 902 functions as, for example, an arithmetic processing unit or a control device, and controls all or some of operations of each constitutional element by executing various programs recorded in the ROM 904, the RAM 906, the memory unit 920, or a removable recording medium 928. The ROM 904 is an example of a memory device which stores therein the program executed by the CPU 902 or data used in arithmetic operations. For example, the program executed by the CPU 902 or various parameters that are changed during the execution of the program are temporarily or permanently stored in the RAM 906.

These elements are connected with each other through, for example, a host bus 908 which allows a high speed data transmission. The host bus 908 is connected with the external bus 912 having a relatively low data transmission speed through, for example, the bridge 910. As the input unit 916, for example, a mouse, a keyboard, a touch panel, a touch pad, a button, a switch, or a lever is utilized. A remote controller capable of transmitting a control signal using infrared rays or other radio waves may be used as the input unit 916.

As the output unit 918, a display device such as, a cathode ray tube (CRT), a liquid crystal display (LCD), a plasma display panel (PDP), or an electro-luminescence display (ELD) is used. Further, for example, an audio output device such as a speaker or a headphone or a printer may be used as the output unit 918. That is, the output unit 918 is an apparatus capable of visually or audibly outputting information.

The memory unit 920 is a device for storing therein various data. For example, a magnetic storage apparatus such as an HDD is used as the memory unit 920. A semiconductor storage apparatus such as an SSD or a RAM disk, an optical storage apparatus, or an opto-magnetic storage apparatus may be used as the memory unit 920.

The drive 922 is a device which reads information recorded in the removable recording medium 928 which is a detachable recording medium and writes information into the removable recording medium 928. For example, a magnetic disk, an optical disk, an opto-magnetic disk, or a semiconductor memory may be used as the removable recording medium 928.

The connection port 924 is a port for connecting external connection equipment 930 such as a universal serial bus (USB) port, an IEEE 1394 port, a small computer system interface (SCSI), an RS-232C port, or an optical audio terminal. For example, a printer may be used as the external connection equipment 930.

The communication unit 926 is a communication device to be connected to a network 932. For example, a communication circuit for a wired or wireless local area network (LAN), a communication circuit for a wireless USB (WUSB), a communication circuit or a router for optical communication, a communication circuit or a router for asymmetric digital subscriber line (ADSL), or a communication circuit for a mobile phone network is used as the communication unit 926. The network 932 connected to the communication unit 926 is a network connected by a wireless connection or a wired connection, and may include, for example, the Internet, LAN, a broadcasting network, and a satellite communication channel.

In the foregoing, an exemplary hardware configuration of the client device 110 has been described. The function of the storage apparatuses 120 and 130 may also be implemented using the hardware configuration illustrated in FIG. 3. Accordingly, descriptions on the hardware configuration of the storage apparatuses 120 and 130 will be omitted.

Figure 4:
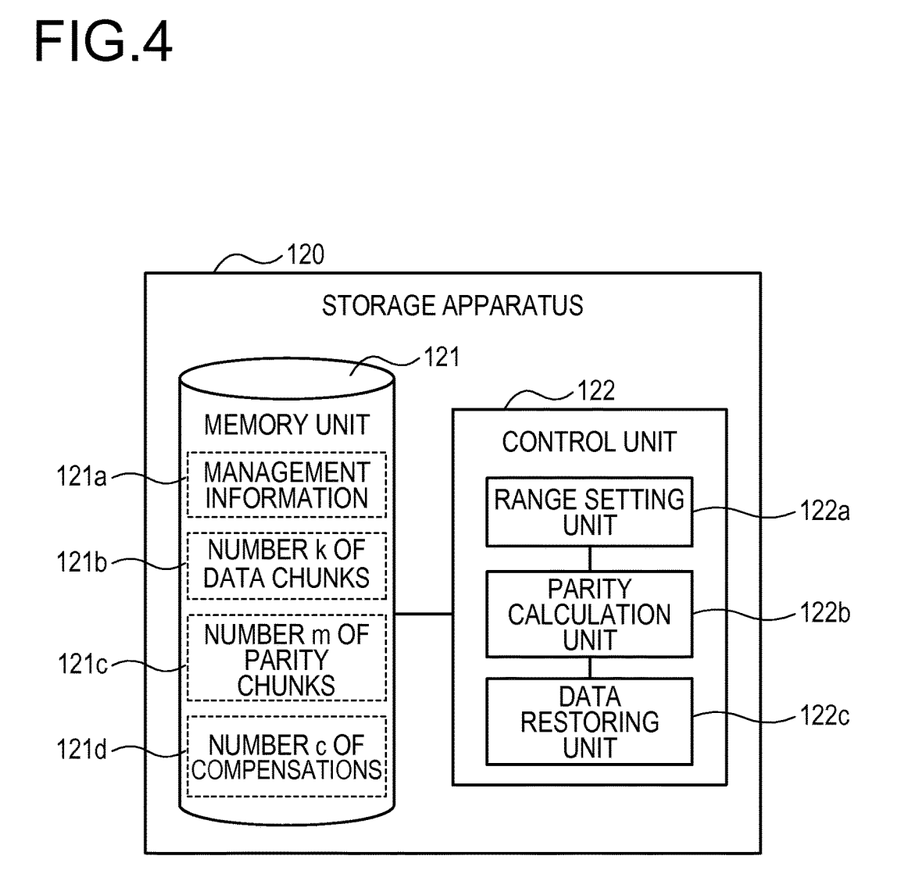
FIG. 4 is a block diagram illustrating an exemplary functional configuration of a storage apparatus according to the second embodiment.

Next, descriptions will be made on a functional configuration of the storage apparatus 120. FIG. 4 is a diagram illustrating an exemplary functional configuration of a storage apparatus according to the second embodiment.

As illustrated in FIG. 4, the storage apparatus 120 includes a memory unit 121 and a control unit 122. The function of the memory unit 121 may be implemented using the RAM 906 or the memory unit 920 described above. The function of the control unit 122 may be implemented using the CPU 902 described above.

Management information 121a is stored in the memory unit 121. The information of the number "k" of data chunks 121b, the information of the number "m" of parity chunks 121c, and the information of the number "c" of compensations 121d are stored in the memory unit 121. The number "c" of compensations indicates the number of parity chunks that compensate a single data chunk. As will be described below, even though the same number of memory devices as the number "c" of compensations are failed, it is guaranteed that all the data chunks may be restored regardless of the combination of the failed memory devices, thereby contributing to the improvement of reliability. Hereinafter, for the convenience of explanation, it is assumed that "k"=5, "m"=3 "c"=2.

The control unit 122 includes a range setting unit 122a, a parity calculation unit 122b, and a data restoring unit 122c. The range setting unit 122a sets a compensation range of a parity chunk. The parity calculation unit 122b calculates the parity chunk using the data chunks belonging to the compensation range which is set by the range setting unit 122a. In a case where a memory device is failed and a data chunk is lost, the data restoring unit 122c restores the lost data chunk using the parity chunk and the remaining data chunks.

Figure 5:
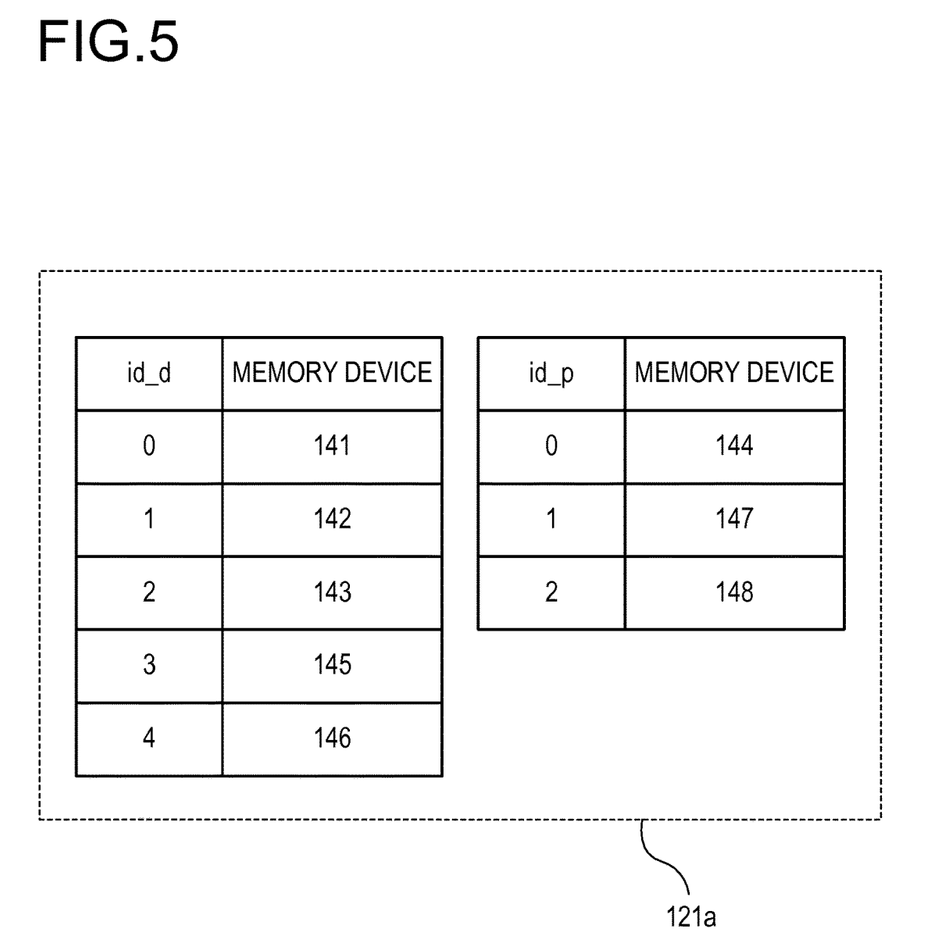
FIG. 5 is a diagram illustrating an example of management information (place information) according to the second embodiment.

Here, descriptions will be made on the management information 121a with reference to FIG. 5 and FIG. 6. FIG. 5 is a diagram illustrating an example of management information (place information) according to the second embodiment. The example of FIG. 5 illustrates place information, among the management information 121a, about memory devices (places) storing therein the data chunks and the parity chunks. The left part of FIG. 5 illustrates an example of information in which a data chunk and a memory device storing the data chunk therein are associated with each other. The right part of FIG. 5 illustrates an example of information in which a parity chunk and a memory device storing the parity chunk therein are associated with each other. An id_d is an identifier (ID) for identifying each data chunk. An id_p is an ID for identifying each parity chunk.

In the example of FIG. 5, the data chunk having an id_d of 0 (zero) is associated with the memory device 141. Similarly, the data chunks having id_d of 1 (one), 2 (two), 3 (three), and 4 (four) are associated with the memory devices 142, 143, 145, and 146, respectively. The parity chunk having an id_p of 0 is associated with the memory device 144. Similarly, the parity chunks having id_p of 1 and 2 are associated with the memory devices 147 and 148, respectively. The control unit 122 refers to the place information to recognize storage places for the data chunks and the parity chunks.

Figure 6:
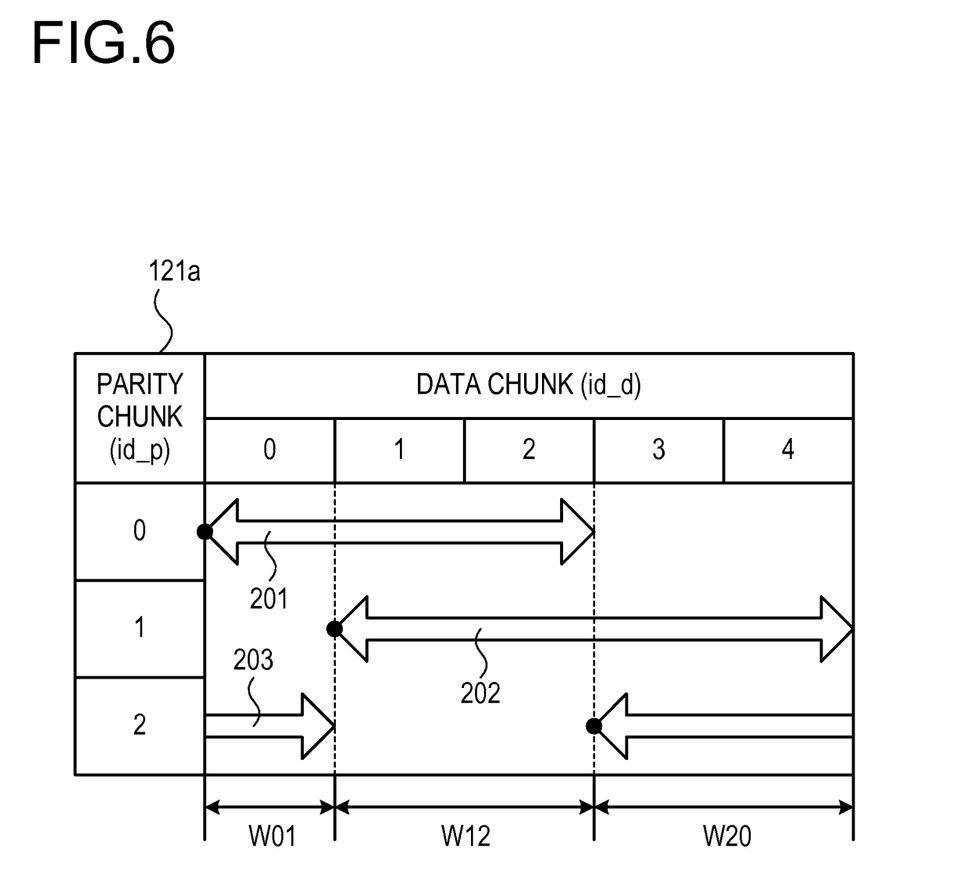
FIG. 6 is a diagram illustrating an example of management information (compensation range) according to the second embodiment.

FIG. 6 is a diagram illustrating an example of management information (compensation range) according to the second embodiment. The example of FIG. 6 illustrates information, among the management information 121a, about a range (compensation range) of data chunks compensated by each parity chunk. In the example of FIG. 6, the number indicated in the column for the item "data chunk (id_d)" indicates an ID of a data chunk and the number indicated in the column for the item "parity chunk (id_p)" indicates an ID of a parity chunk. The arrows indicate compensation ranges 201, 202, and 203 of the respective parity chunks. The bullets at the left end of the compensation ranges 201, 202, and 203 indicate respective start points of the compensation ranges 201, 202, and 203.

For example, the compensation range 201 is a range of data chunks compensated by the parity chunk having the id_p of 0. In the example of FIG. 6, the compensation range 201 includes the data chunks having the id_d of 0, 1, and 2. That is, the compensation range 201 indicates that the parity chunk having the id_p of 0 compensates the data chunks having the id_d of 0, 1, and 2.

Similarly, the compensation range 202 corresponding to the parity chunk having the id_p of 1 indicates that the parity chunk compensates the data chunks having the id_d of 1, 2, 3, and 4. Further, the compensation range 203 corresponding to the parity chunk having the id_p of 2 indicates that the parity chunk compensates the data chunks having the id_d of 3, 4, and 0.

As illustrated in FIG. 6, each of the compensation ranges 201, 202, and 203 is set to include data chunks having continuous IDs. Here, it is assumed that the id_d of 0 (id_d=0) is next to the id_d of 4 (id_d=4) (the result of modulo operation). Each of the compensation ranges 201, 202, and 203 may have a different length of the range (size of compensation range). For example, while the length of the range of each of the compensation ranges 201 and 203 is 3 (three) (three data chunks), the length of the range of the compensation range 202 is 4 (four) (four data chunks).

Descriptions will be made on the method for setting the compensation ranges 201, 202, and 203. The range setting unit 122a performs the processing of setting the compensation ranges 201, 202, and 203. The setting rule for the compensation ranges 201, 202, and 203 includes the following three conditions: compensating a plurality of data chunks having continuous id_d (Condition_1), uniformly arranging the start points by limiting the difference in the distances between adjacent start points to 1 (one) (Condition_2), and setting the number of compensations to "c" (2 (two) in this example) (Condition_3). Since consecutive numbers starting from 0 (zero) are assigned in the item of id_p in the example of FIG. 6, the range setting unit 122a may determine the start point and the end point in accordance with the following Equation (1) and Equation (2), respectively. The floor function (floor(x)) used in the following Equation (1) and Equation (2) indicates the greatest integer number less than or equal to "x" which is a real number.

$$Id\_d = \text{floor}(id\_p \times k/m) \bmod k \quad (1)$$

$$Id\_d = \text{floor}((id\_p+c) \times k/m - 1) \bmod k \quad (2)$$

According to Equation (1) and Equation (2) described above, the start point of the compensation range 201 corresponding to the parity chunk having the id_p of 0 corresponds to the data chunk having the id_d of 0. The end point of the compensation range 201 corresponds to the data chunk having the id_d of 2. Similarly, the range setting unit 122a may determine the start points and the end points of the compensation ranges 202 and 203.

According to the method described above, as illustrated in FIG. 6, the distance W01 between the start points of the compensation ranges 201 and 202 becomes 1 (one). The distance W12 between the start points of the compensation ranges 202 and 203 becomes 2 (two) and the distance W20 between the start points of the compensation ranges 203 and 201 becomes 2 (two). Accordingly, |W01−W12| becomes 1, |W12−W20| becomes 0, and |W20−W01| becomes 1 and thus, Condition_2 described above is satisfied (| . . . | indicates an absolute value). Further, each of the data chunks having the id_d of 0, 1, 2, 3, and 4 is included in two of the compensation ranges 201, 202, and 203 and thus, Condition_3 described above is also satisfied. Since Condition_1 is a prerequisite of the calculation, all of Condition_1, Condition_2, and Condition_3 described above are satisfied.

When the compensation ranges 201, 202, and 203 are set as illustrated in FIG. 6, even though any two (which is the same number as the number "c" of compensations) memory devices are failed, all of the data chunks may be restored. There is also a possibility that all of the data chunks may be restored when three (which is the same number as the number "m" of parity chunks) memory devices are failed at the maximum. The data restoring unit 122c performs the data chunk restoration processing.

For example, when the memory devices 141 and 142 are failed, the data chunks having the id_d of 0 and 1 are lost (see FIG. 5). In this case, the data restoring unit 122c may restore the data chunk having the id_d of 0 using the data chunks having the id_d of 3 and 4 and the parity chunk having the id_p of 2 which corresponds to the compensation range 203.

Further, the data restoring unit 122c may restore the data chunk having the id_d of 1 using the data chunks having the id_d of 2, 3 and 4 and the parity chunk having the id_p of 1 which corresponds to the compensation range 202. At this time, the data restoring unit 122c may restore the data chunk having the id_d of 1 using the data chunk having the id_d of 0 which is restored previously, the data chunk having the id_d of 2, and the parity chunk having the id_p of 0 which corresponds to the compensation range 201.

When the memory devices 146 and 148 are failed, the data chunk having the id_d of 4 and the parity chunk having the id_p of 1 are lost (see FIG. 5). In this case, the data restoring unit 122c may restore the data chunk having the id_d of 4 using the data chunks having the id_d of 1, 2, and 3 and the parity chunk having the id_p of 2 which corresponds to the compensation range 202. When the data chunk having the id_d of 4 is restored, the parity chunk having the id_p of 2 may be calculated using the data chunks having the id_d of 3, 4, and 0.

Beyond the examples described above, the data restoring unit 122c may restore all of the data chunks when two memory devices are failed at the maximum regarding any combination of the memory devices. The example of FIG. 6 illustrates a case where the number "c" of compensations is set to 2 (two). When the number "c" of compensations is set to 3 (three), all of the data chunks may be restored even though three memory devices are failed at the maximum. As described above, according to the method for setting the compensation ranges described above, the tolerability against failures of memory devices is guaranteed up to the number "c" of compensations regardless of the combination of the failed memory devices, such that the system with high reliability is implemented.

Figure 7:
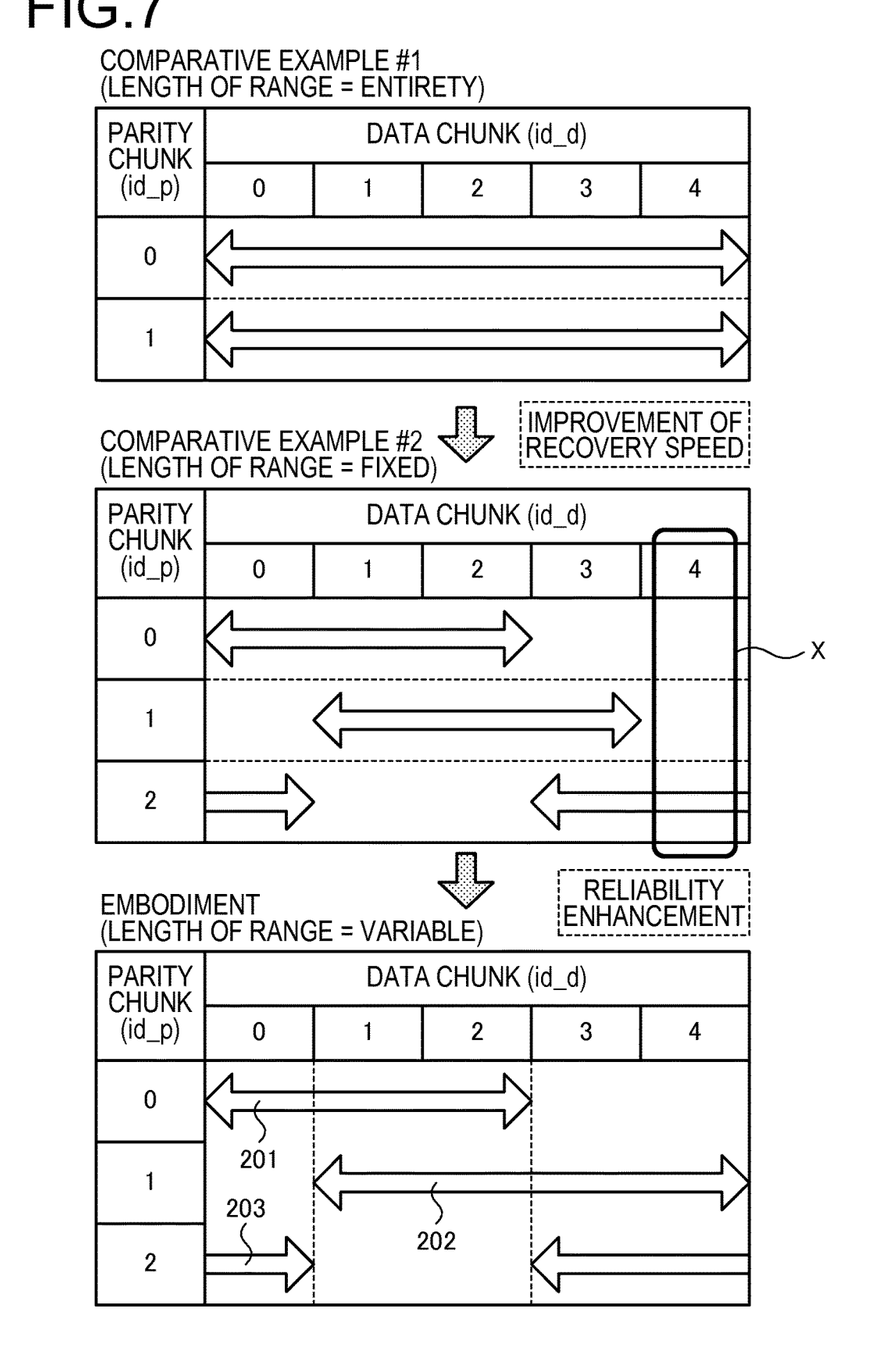
FIG. 7 is a diagram illustrating an example of a setting of a compensation range according to the second embodiment and comparative examples.

Here, an additional description is provided for the recovery speed and the reliability described above. FIG. 7 is a diagram illustrating an example of a setting of a compensation range according to the second embodiment and comparative examples.

The upper part of FIG. 7 corresponds to a comparative example (Comparative Example #1) illustrating a method in which all the data chunks are included in each compensation range. In a case of Comparative Example #1, since two parity chunks, each of which compensates all the data chunks, are set, all the data chunks may be restored even when two memory devices are failed. However, since all the remaining data chunks are to be read in order to restore a single data chunk, a time needed for reading the data chunks becomes longer.

Comparative Example #2 illustrated in the middle part of FIG. 7 corresponds to a method in which the read time is made shorter to improve the recovery speed as compared to Comparative Example #1. In Comparative Example #2, since the length of the compensation range is set to a fixed number less than the total number of the data chunks, the number of data chunks to be read in the restoration is reduced. As a result, the read time in Comparative Example #2 is made shorter than that of Comparative Example #1 and thus, the recovery speed is improved. However, a portion X in the middle part of FIG. 7 includes an element which reduces reliability as described below.

In the portion X, only a single parity chunk (parity chunk having the id_p of 2) which compensates the data chunk having the id_d of 4 is present. Accordingly, when the parity chunk having the id_p of 2 together with the data chunk having the id_d of 4 is lost, it becomes unable to restore the lost data chunk. That is, the combination of the failed memory devices (the combination of the lost chunks) may cause a situation where the lost chunks may not be restored when two memory devices are failed.

In some cases, even though the length of the range is fixed as in Comparative Example #2, a cause that deteriorates the reliability such as in the portion X does not occur. However, if a risk of occurrence of the cause is removed, a highly reliable system may be implemented which allows a user to utilize the system comfortably. A method in which removal of the risk is implemented corresponds to a setting example (which corresponds to FIG. 6) of the compensation range according to the second embodiment illustrated at the lower part of FIG. 7. The setting example guarantees that all of the data chunks are restored for the same number of failed memory devices as the number "c" of compensations by using the same number of parity chunks as that of Comparative example #2 regardless of the combination of the failed memory devices.

As described above, although the recovery speed and the reliability are in a tradeoff relationship, when a method for setting the compensation range according to the second embodiment is applied, the reliability is improved while implementing a suitable recovery speed.

In the foregoing, the function of the storage apparatus 120 has been described. When the storage apparatus 130 is configured to have a configuration to execute the setting of the compensation ranges and the calculation of the parity chunks, the storage apparatus 130 may have the same function as that of the storage apparatus 120 described above.

Next, descriptions will be made on the flows of parity chunk calculation and data chunk restoration among the operations of the storage apparatus 120.

The parity chunk calculation includes the setting of compensation ranges and calculation of a parity chunk using the data chunks of each set compensation range.

The compensation range may be set on the basis of Equation (1) and Equation (2) described above as having been described with reference to the example of FIG. 6. Here, a technical spirit represented by Equation (1) and Equation (2) described above will be described with reference to a flowchart (FIG. 8) represented by a processing flow. FIG. 9 will be appropriately referenced in the descriptions.

Figure 8:
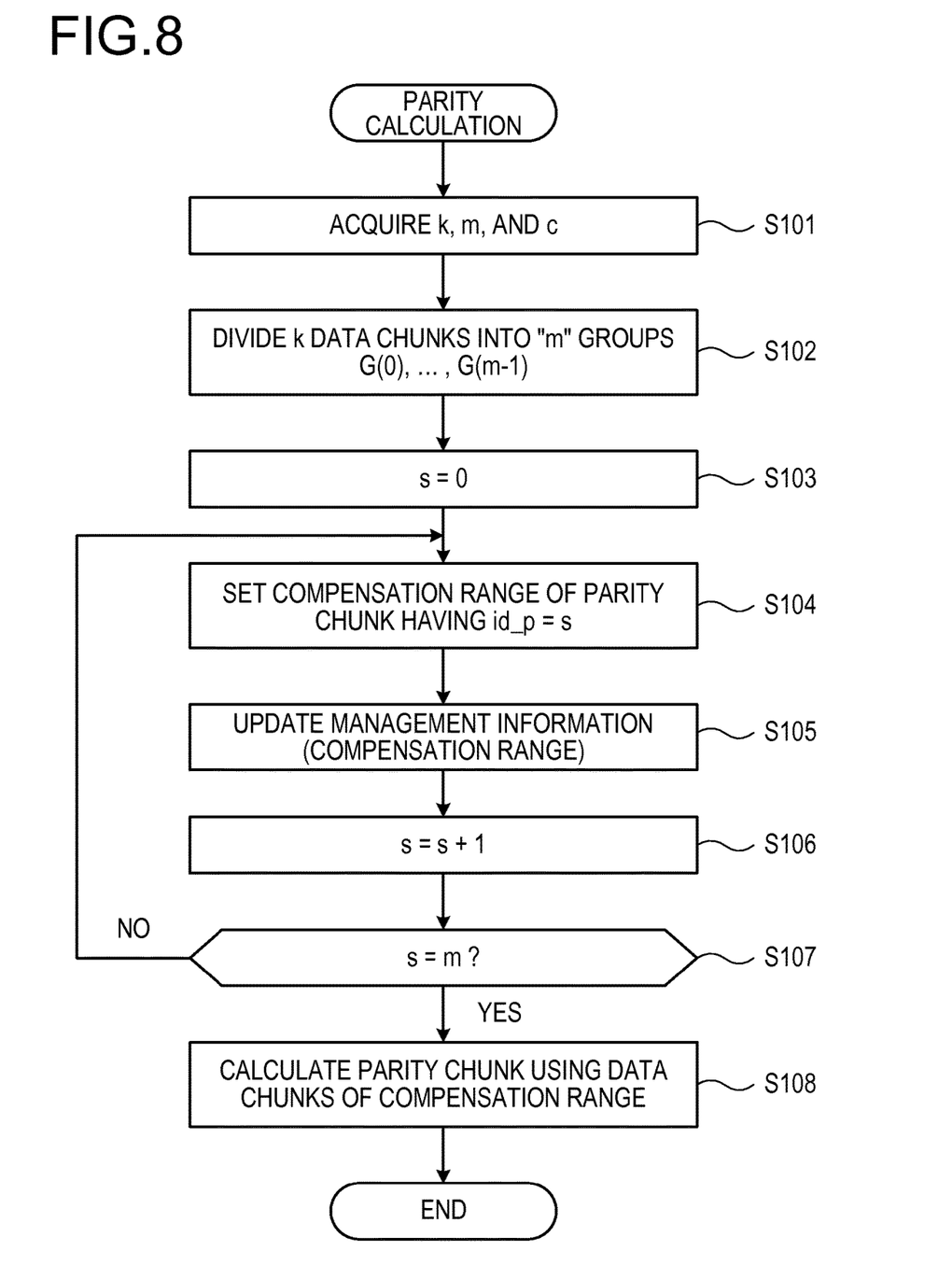
FIG. 8 is a flowchart illustrating an example of calculation of parity chunks according to the second embodiment.
Figure 9:
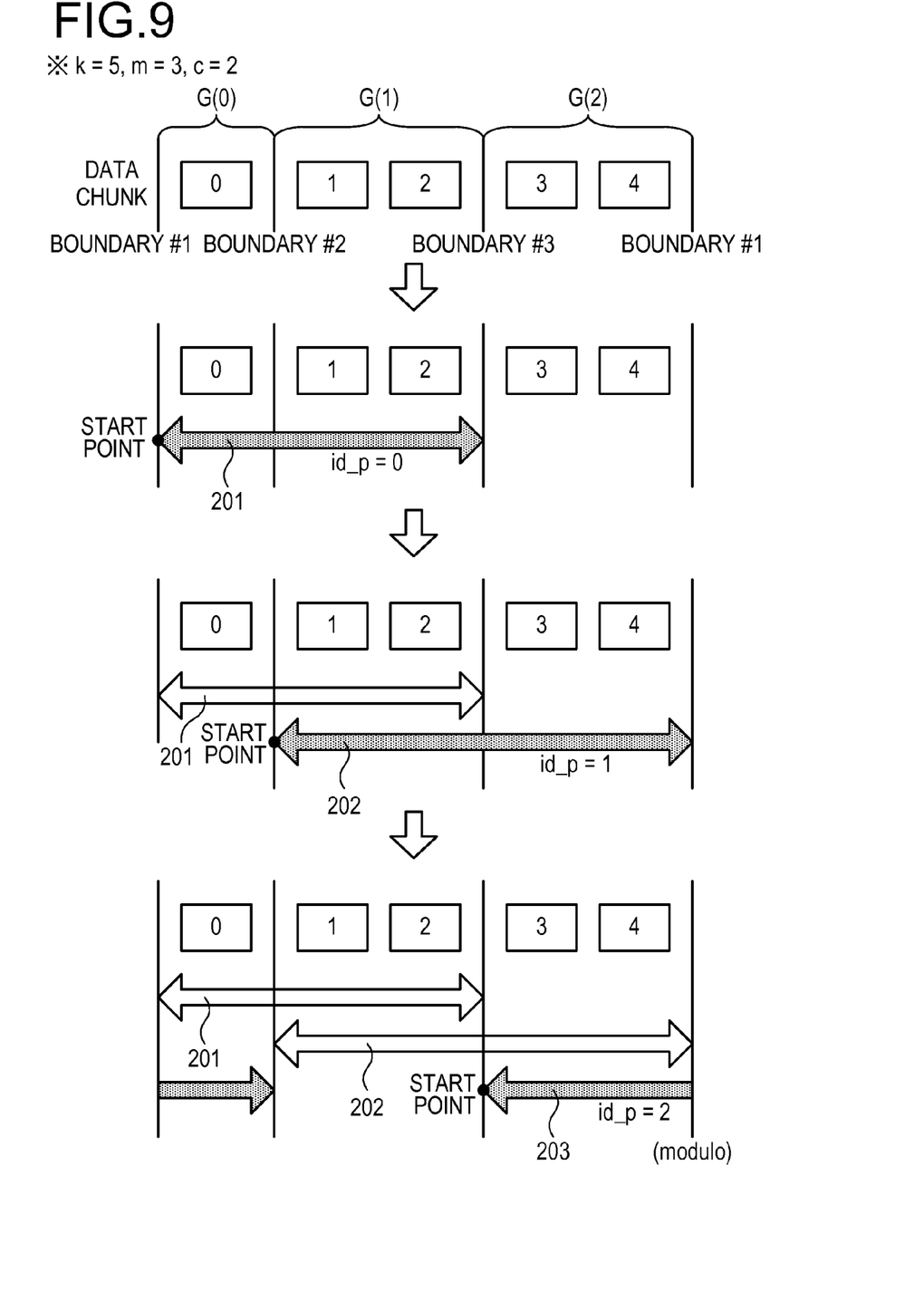
FIG. 9 is a diagram illustrating an example of a method for setting compensation ranges according to the second embodiment.

FIG. 8 is a flowchart illustrating an example of calculation of the parity chunks according to the second embodiment. FIG. 9 is a diagram illustrating an example of a method for setting compensation ranges according to the second embodiment. The range setting unit 122a reads information 121b, 121c, and 121d from the memory unit 121 to acquire the number "k" of data chunks, the number "m" of parity chunks, and the number "c" of compensations (S101). It is assumed that the numbers "k", "m", and "c" are set in advance. The example of FIG. 9 illustrates a case where "k" is 5, "m" is 3, and "c" is 2. In FIG. 9, a data chunk is represented by a block in which a number is given and the number indicates the id_d of the data chunk.

The range setting unit 122a divides "k" data chunks into "m" groups of G(0), . . . , and G(m−1) (S102). That is, the range setting unit 122a generates the same number of groups as the number of parity chunks.

In the example of the upper most part of FIG. 9, five data chunks are divided into a group G(0) including the data chunk having the id_d of 0, a group G(1) including the data chunks having the id_d of 1 and 2, and a group G(2) including the data chunks having the id_d of 3 and 4. For the convenience of explanation, a boundary between the G(0) and the G(1) is denoted as a boundary #2, a boundary between the G(1) and the G(2) is denoted as a boundary #3, and a boundary between the G(2) and the G(0) is denoted as a boundary #1.

The range setting unit 122a sets a parameter "s" to an initial value of 0 (zero) (s=0) (S103). The range setting unit 122a sets a section ranging from the head of G(s) to the tail of G(s+c−1) as a compensation range of a parity chunk having the id_p of "s" (S104). That is, the range setting unit 122a sets the compensation range beginning with the G(s) to be extended across the same number of groups as the number of compensations. In other words, the range setting unit 122a sets a section ranging from a boundary located at the head of the G(s) to "c" boundaries ahead as a compensation range.

In the example of FIG. 9, when the parameter "s" is 0, the range setting unit 122a sets the section ranging from the head of the G(0) to the tail of the G(1) as the compensation range of the parity chunk having the id_p of 0. That is, as illustrated in the second upper part of FIG. 9, the section ranging from the data chunk (id_d=0) located at the head of the G(0) to the data chunk (id_d=2) located at the tail of the G(1) is set to the compensation range (compensation range 201) of the parity chunk having id_p of 0.

In this example, the compensation range 201 is set to extend across two groups G(0) and G(1). Further, the compensation range 201 is set to the section ranging from the boundary #1 located at the head of the G(0) to the boundary #3 located ahead of two boundaries.

The range setting unit 122a adds the information of the set compensation range to the management information 121a to update the management information 121a (S105). The range setting unit 122a increments the parameter "s" (s=s+1) (S106). The range setting unit 122a determines whether the parameter "s" is identical with the number "m" (s=m) (S107). When it is determined that the parameter "s" is identical with the number "m", the calculation process proceeds to S108. When it is determined that the parameter "s" is not identical with the number "m", the calculation process proceeds to S104.

That is, when there is a parity chunk for which the compensation range is unset, the calculation process proceeds to S104. As illustrated in the second lower part and the lower most part of FIG. 9, S104 to S107 are repeatedly executed while the parameter "s" is being updated, such that the compensation ranges 202 and 203 that correspond to the parity chunks having the id_p of 1 and 2 are sequentially set. When setting of the compensation range is finished for all the parity chunks, the calculation process proceeds to S108.

The parity calculation unit 122b refers to the management information 121a to identify the data chunks of the compensation range which is set for each parity chunk and calculates the parity chunk using the identified data chunks (S108).

For example, the parity calculation unit 122b identifies the id_d (id_d=0, 1, and 2) of the data chunks included in the compensation range 201 from the management information 121a (see FIG. 6) when calculating the parity chunk (id_p=0) corresponding to the compensation range 201. Further, the parity calculation unit 122b recognizes the memory devices (memory devices 141, 142, and 143) corresponding to the identified id_d from the management information 121a (see the left part of FIG. 5).

Next, the parity calculation unit 122b accesses the recognized memory devices 141, 142, and 143 and calculates the parity chunk having the id_p of 0 using the data chunks read from the memory devices 141, 142, and 143. In a case where the RS code is used as the parity chunk, the parity calculation unit 122b calculates the parity chunk by finding a solution of a system of linear equations on the basis of a plurality of data chunks. The parity calculation unit 122b identifies the memory device (the memory device 144) storing the parity chunk calculated from the management information 121a (see the right part of FIG. 5) and writes the parity chunk in the identified memory device 144.

Figure 10:
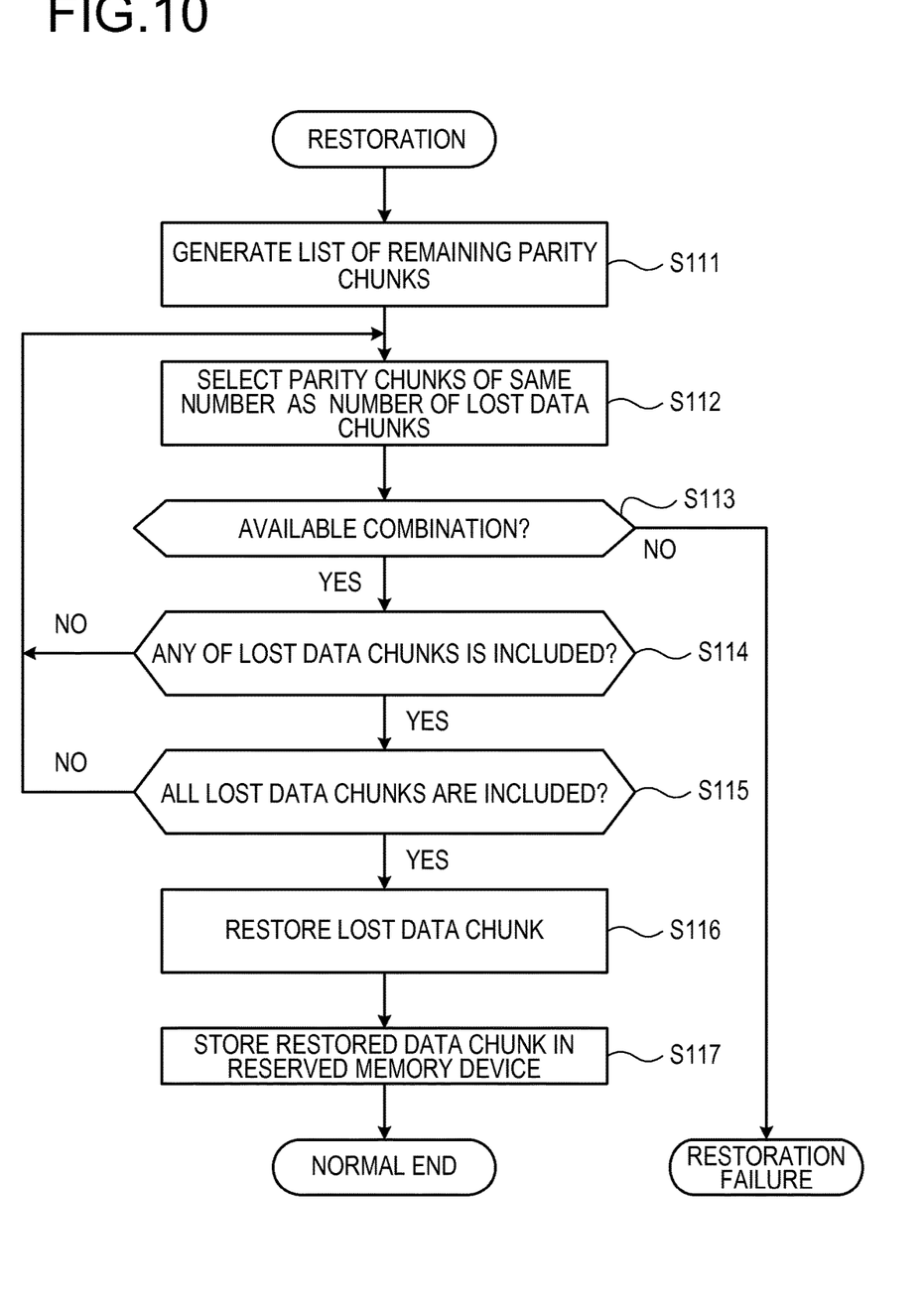
FIG. 10 is a flowchart illustrating an example of a restoration method according to the second embodiment.

When the processing of S108 is completed, the calculation of the processing flow illustrated in FIG. 8 is ended. Next, descriptions will be made on a processing flow of restoration of the lost data chunk. FIG. 10 is a flowchart illustrating an example of a restoration method according to the second embodiment.

When an occurrence of a fault of the memory device is notified from the client device 110, the data restoring unit 122c generates a list of remaining parity chunks except for the lost parity chunk (S111). When a fault does not occur in a memory device in which a parity chunk is stored, a list including all the parity chunks is generated. The data restoring unit 122c stores the generated list in the memory unit 121.

The data restoring unit 122c selects the same number of parity chunks as the number of lost data chunks from the list (S112). In this case, the combination of already selected parity chunks is not allowed to be selected. The data restoring unit 122c determines whether there is an available combination of the parity chunks (S113). When it is determined that there is no available combination of the parity chunks and there is no unselected combination, the data restoring unit 122c notifies a failure in restoration to the client device 110 and ends the processing flow illustrated in FIG. 10. When it is determined that there is an available combination of the parity chunks, the restoration process proceeds to S114.

The data restoring unit 122c determines whether the compensation range of each selected parity chunk includes the lost data chunk (S114). When it is determined that the compensation range of each selected parity chunk includes the lost data chunk, the restoration process proceeds S115. When it is determined that the compensation range of any selected parity chunk does not include the lost data chunk, the restoration process proceeds to S112. That is, when there is a parity chunk which does not include the lost data chunk in the compensation range, the selection at S112 is performed again.

The data restoring unit 122c determines whether all the lost data chunks are included in any of the compensation ranges (S115). When it is determined that all lost data chunks are included in any of the compensation ranges, the restoration process proceeds to S116. When it is determined that any one of the lost data chunks is not included in the compensation ranges, the restoration process proceeds to S112. That is, in a case where there is a data chunk which is not included in any of the compensation ranges of the selected parity chunks, since the data chunk is unable to be restored, the selection at S112 is performed again.

The data restoring unit 122c finds a solution of a system of linear equations (in a case where the RS code is used) on the basis of the selected parity chunks and the remaining data chunks included in the compensation ranges to restore the lost data chunks (S116). The data restoring unit 122c stores the restored data chunk in a reserved memory device and notifies a normal end in restoration to the client device 110 (S117).

When the processing at S117 is completed, a processing flow of the restoration illustrated in FIG. 10 is ended. In the foregoing, the operations of the storage apparatus 120 have been described. By adopting the method for setting the compensation range described above, it becomes possible to implement improvement of the reliability while enhancing the recovery speed as illustrated in FIG. 7.

In the foregoing, the second embodiment has been described.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   storing a plurality of data pieces in a plurality of memory devices, respectively; and
   setting compensation ranges of the data pieces to be compensated by a corresponding number of parities, respectively, the compensation ranges being respective portions of consecutive data pieces among the stored data pieces, each of the compensation ranges including a variably set number of the consecutive data pieces, such that at least one of the compensation ranges includes a different number of the consecutive data pieces than another of the compensation ranges.

2. The non-transitory computer-readable recording medium according to claim 1, the process comprising:
setting the compensation ranges such that a variation in numbers of the consecutive data pieces between start points of any two adjacent compensation ranges is at most 1 (one).

3. The non-transitory computer-readable recording medium according to claim 1, the process comprising:
dividing the plurality of stored data pieces into a number of first data groups; and
setting each of the first compensation ranges to include a number of data groups among the first data groups.

4. A non-transitory computer-readable recording medium according to claim 1, wherein at least one of the stored plurality of data pieces is included in at least two of the compensation ranges.

5. The non-transitory computer-readable recording medium according to claim 1, wherein each of the stored plurality of data pieces is included in at least two of the compensation ranges.

6. A storage system, comprising:
a plurality of first memory devices configured to respectively store therein a plurality of data pieces;
a predetermined number of second memory devices configured to respectively store therein a number of parities; and
a storage apparatus including:
a processor configured to
store the plurality of data pieces in the plurality of first memory devices, and
set compensation ranges of the data pieces to be compensated by the number of parities, respectively, and the compensation ranges being respective portions of consecutive data pieces among the stored data pieces, each of the compensation ranges including a variably set number of the consecutive data pieces, such that at least one of the compensation ranges includes a different number of the consecutive data pieces than another of the compensation ranges.

7. A storage apparatus, comprising:
a plurality of memories; and
a processor coupled to the plurality of memories and the processor configured to
store a plurality of data pieces in the plurality of memories, and
set compensation ranges of the data pieces to be compensated by a corresponding number of parities, respectively, the compensation ranges being respective portions of consecutive data pieces among the stored data pieces, each of the compensation ranges including a variably set number of the consecutive data pieces, such that at least one of the compensation ranges includes a different number of the consecutive data pieces than another of the compensation ranges.

* * * * *